(12) United States Patent
Hall (10) Patent No.: US 8,459,625 B1
(45) Date of Patent: Jun. 11, 2013

(54) DEVICE FOR SECURING VEHICLE BODY TO CONVEYOR CARRIER

(75) Inventor: Chris Hall, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 702 days.

(21) Appl. No.: 12/415,617

(22) Filed: Mar. 31, 2009

(51) Int. Cl.
- *B23Q 3/00* (2006.01)
- *B25B 1/00* (2006.01)
- *B25B 1/16* (2006.01)
- *B43L 5/00* (2006.01)
- *H01L 21/677* (2006.01)
- *B65B 21/02* (2006.01)
- *B65B 69/00* (2006.01)
- *B65F 3/02* (2006.01)
- *B65G 65/04* (2006.01)
- *B65G 65/34* (2006.01)
- *B65G 37/00* (2006.01)
- *B23P 21/00* (2006.01)
- *B25B 1/06* (2006.01)

(52) U.S. Cl.
USPC ............... 269/216; 269/9; 269/95; 414/408; 414/217; 29/784; 198/570

(58) Field of Classification Search
USPC ............... 269/216, 9, 95; 414/408, 621, 217, 414/21, 563, 809; 198/570, 345.3, 803.9
See application file for complete search history.

(56) References Cited

U.S. PATENT DOCUMENTS

| | | | |
|---|---|---|---|
| 3,667,167 A * | 6/1972 | Happel | 451/335 |
| 3,670,549 A * | 6/1972 | Tselikov et al. | 72/208 |
| 3,678,525 A * | 7/1972 | Lloyd et al. | 15/77 |
| 3,807,532 A * | 4/1974 | Molt | 188/43 |
| 3,816,955 A * | 6/1974 | Conibear | 43/90 |
| 3,964,564 A * | 6/1976 | Pittarelli | 180/219 |
| 3,998,338 A * | 12/1976 | Suzuki et al. | 414/744.7 |
| 4,012,027 A * | 3/1977 | Hooper | 266/58 |
| 4,034,456 A * | 7/1977 | Bowers | 29/788 |
| 4,085,566 A * | 4/1978 | Crowe et al. | 53/529 |
| 4,147,376 A * | 4/1979 | Slazas | 280/489 |
| 4,175,903 A * | 11/1979 | Carson | 414/408 |
| 4,175,904 A * | 11/1979 | Airaksinen | 414/421 |
| 4,182,094 A * | 1/1980 | Lieder et al. | 53/67 |
| 4,253,289 A * | 3/1981 | Cole et al. | 53/53 |
| 4,267,746 A * | 5/1981 | Pruett | 74/489 |
| 4,287,704 A * | 9/1981 | Meyers et al. | 53/564 |
| 4,294,442 A | 10/1981 | Kolnes et al. | |
| 4,313,633 A * | 2/1982 | Muntjanoff et al. | 294/88 |
| 4,462,606 A * | 7/1984 | Hon | 280/278 |
| 4,483,476 A | 11/1984 | Fujikawa et al. | |
| 4,619,631 A * | 10/1986 | Darby | 174/80 |
| 4,638,904 A * | 1/1987 | Randar et al. | 198/468.2 |
| 4,638,906 A * | 1/1987 | Winiasz | 198/803.9 |
| 4,659,895 A * | 4/1987 | Di Rosa | 219/79 |

(Continued)

*Primary Examiner* — Lee D Wilson
*Assistant Examiner* — Alvin Grant
(74) *Attorney, Agent, or Firm* — Standley Law Group LLP (57) ABSTRACT

A vehicle body clamping device including a clamping linkage unit adapted for mounting to a conveyor carrier at a location beneath a vehicle body while said vehicle body is carried on a conveyor carrier. A clamping actuation assembly is located below the conveyor carriers and along their path of travel, and includes a pair of actuator units for operating the clamping linkage. Activation of a first actuator unit cause the clamping linkage to place a clamping bar thereof in an unclamped position, such that a vehicle body can be loaded to or removed from the conveyor carrier. Activation of the second actuator unit cause the clamping linkage to place the clamping bar in a clamped position, such that a vehicle body is securely clamped to the conveyor carrier.

7 Claims, 10 Drawing Sheets

U.S. PATENT DOCUMENTS

| | | | |
|---|---|---|---|
| 4,726,729 A * | 2/1988 | Olson et al. | 414/621 |
| 4,728,316 A * | 3/1988 | Darby | 474/80 |
| 4,736,695 A * | 4/1988 | Junemann | 112/470.14 |
| 4,751,995 A * | 6/1988 | Naruse et al. | 198/345.3 |
| 4,761,110 A * | 8/1988 | Boutilier | 414/563 |
| 4,802,616 A * | 2/1989 | Naruse et al. | 228/4.1 |
| 4,911,597 A * | 3/1990 | Maydan et al. | 414/217 |
| 4,921,294 A * | 5/1990 | Klopfenstein | 294/99.1 |
| 4,971,082 A * | 11/1990 | Kovaletz | 134/34 |
| 4,979,063 A * | 12/1990 | Ghose et al. | 360/264.3 |
| 4,988,258 A * | 1/1991 | Lutz et al. | 414/500 |
| 5,007,624 A * | 4/1991 | Chandhoke | 270/58.2 |
| 5,015,142 A * | 5/1991 | Carson | 414/408 |
| 5,018,929 A * | 5/1991 | Carson | 414/408 |
| 5,029,765 A * | 7/1991 | Gastreich | 242/476.9 |
| 5,031,956 A * | 7/1991 | Hudgins | 296/100.16 |
| 5,049,030 A * | 9/1991 | Lockert | 414/788.7 |
| 5,071,303 A * | 12/1991 | Carson | 414/21 |
| 5,088,875 A * | 2/1992 | Galbreath et al. | 414/478 |
| 5,104,033 A * | 4/1992 | Tanaka et al. | 228/176 |
| 5,119,615 A * | 6/1992 | Kujubu et al. | 53/53 |
| 5,123,161 A * | 6/1992 | Kubo et al. | 29/784 |
| 5,127,594 A * | 7/1992 | Lombardi et al. | 242/433.4 |
| 5,151,009 A * | 9/1992 | Lockert | 414/793.5 |
| 5,172,802 A * | 12/1992 | Wells | 198/470.1 |
| 5,189,958 A * | 3/1993 | Tafel et al. | 101/415.1 |
| 5,214,904 A * | 6/1993 | DePoint et al. | 53/468 |
| 5,257,744 A * | 11/1993 | Lombardi et al. | 242/433.4 |
| 5,258,741 A * | 11/1993 | Fuller | 340/426.31 |
| 5,283,922 A * | 2/1994 | Ruprecht | 15/104.33 |
| 5,460,237 A * | 10/1995 | Schueman | 180/209 |
| 5,497,643 A * | 3/1996 | Koch et al. | 72/217 |
| 5,560,463 A * | 10/1996 | Link et al. | 192/70.252 |
| 5,575,462 A * | 11/1996 | Blatt | 269/32 |
| 5,592,809 A * | 1/1997 | Marcotrigiano et al. | 59/25 |
| 5,598,736 A * | 2/1997 | Erskine | 72/389.6 |
| 5,634,536 A * | 6/1997 | Sturges | 188/77 R |
| 5,676,271 A * | 10/1997 | Reynard | 220/1.5 |
| 5,688,068 A * | 11/1997 | Kaneta | 403/325 |
| 5,690,203 A * | 11/1997 | Link et al. | 192/70.252 |
| 5,699,210 A * | 12/1997 | Thompson et al. | 360/99.06 |
| 5,702,734 A * | 12/1997 | Hartman et al. | 425/534 |
| 5,706,735 A * | 1/1998 | Lund | 104/88.04 |
| 5,909,892 A * | 6/1999 | Richardson | 280/477 |
| 5,940,961 A | 8/1999 | Parete | |
| 6,193,046 B1 | 2/2001 | Segawa et al. | |
| 6,241,049 B1 * | 6/2001 | Gooch | 187/285 |
| 6,241,270 B1 * | 6/2001 | Andre | 280/499 |
| 6,378,186 B1 | 4/2002 | Angel | |
| 6,382,397 B2 * | 5/2002 | Maeder | 198/465.4 |
| 6,766,629 B2 * | 7/2004 | Smith et al. | 53/474 |
| 6,863,739 B2 * | 3/2005 | Fratello et al. | 134/18 |
| 6,908,255 B2 * | 6/2005 | Kendall et al. | 403/374.5 |
| 6,957,808 B2 * | 10/2005 | Varzino et al. | 269/95 |
| 6,992,453 B2 * | 1/2006 | Yasui et al. | 318/560 |
| 7,004,801 B2 * | 2/2006 | Bryham | 440/12.54 |
| 7,018,247 B1 * | 3/2006 | Ranta et al. | 439/858 |
| 7,056,390 B2 * | 6/2006 | Fratello et al. | 134/18 |
| 7,066,457 B2 * | 6/2006 | Gerritsen et al. | 269/6 |
| 7,100,926 B2 * | 9/2006 | Osterlanger et al. | 280/5.502 |
| 7,309,205 B2 * | 12/2007 | McCrory et al. | 414/809 |
| 7,331,156 B2 * | 2/2008 | Hartness et al. | 53/251 |
| 7,413,394 B2 * | 8/2008 | Risser | 414/542 |
| 7,431,309 B2 * | 10/2008 | Kobayashi | 280/6.159 |
| 7,637,552 B2 * | 12/2009 | Ruhlander et al. | 296/57.1 |
| 7,641,183 B2 * | 1/2010 | Fuller et al. | 269/6 |
| 7,766,589 B2 * | 8/2010 | Lobl et al. | 410/94 |
| 7,775,308 B2 * | 8/2010 | Strong | 180/24.02 |
| 7,775,533 B2 * | 8/2010 | Strong | 280/86.5 |
| 7,802,364 B2 * | 9/2010 | Baulier | 29/897.2 |
| 7,819,210 B2 * | 10/2010 | Tonoli et al. | 180/65.21 |
| 2002/0014142 A1 * | 2/2002 | Ward et al. | 82/165 |
| 2004/0195750 A1 * | 10/2004 | Migliori | 269/216 |
| 2007/0089637 A1 * | 4/2007 | Sproat | 105/72.2 |
| 2008/0092391 A1 * | 4/2008 | Jin | 29/897.2 |
| 2008/0106017 A1 * | 5/2008 | Yerly | 269/9 |
| 2008/0184502 A1 * | 8/2008 | Roberts | 14/71.1 |
| 2008/0187674 A1 * | 8/2008 | Wentworth et al. | 427/429 |
| 2008/0234886 A1 * | 9/2008 | Richter | 701/25 |
| 2008/0263791 A1 * | 10/2008 | Roberts | 14/71.1 |
| 2008/0292439 A1 * | 11/2008 | Dunkel | 414/537 |
| 2009/0277752 A1 * | 11/2009 | Doepker | 198/570 |

* cited by examiner

DEVICE FOR SECURING VEHICLE BODY TO CONVEYOR CARRIER

BACKGROUND OF THE INVENTIVE FIELD

The present invention is directed to a device for securing a vehicle body to a conveyor carrier. More particularly, the present invention is directed to a device for securing a vehicle body to subjacent conveyor carrier section so as to prevent floating of the vehicle body during submersion thereof in a coating tank.

The coating of a raw vehicle body (e.g., "white" body) by submersion in a tank of protective coating material is well known in automotive and other vehicle manufacturing industries. For example, a vehicle body may be submerged in a phosphate tank and/or a tank of electrically charged coating material (e-coat material). Such protective coating materials are generally applied to a vehicle body prior to primers (if used) and paints to provide the vehicle body with improved corrosion resistance.

In a vehicle manufacturing environment, such a coating process typically occurs with the vehicle body attached to a carrier of an assembly line conveyor. Because the entire vehicle body is submerged in the tank of coating material, it must be ensured that the vehicle body remains on the carrier, and is not dislodged as a result of the buoyant forces of the coating material.

Various devices have, therefore, been developed to secure a vehicle body to a conveyor carrier in a manner that prevents any floating of the vehicle body while submerged in a coating tank. Unfortunately, the devices known to the inventor suffer from various deficiencies. For example, known devices do not guarantee positive locking, nor do they indicate or provide a way to readily determine whether a fully locked position has been achieved.

It should also be realized that subjecting a conveyor carrier and its associated components to a protective coating bath is generally problematic. Specifically, as at least a portion of the conveyor carrier is submerged in the protective coating tank along with the vehicle body, the conveyor carrier and its components typically experience an undesirable buildup of protective coating material.

Unfortunately, the inventor has observed that this buildup of protective coating material often interferes with proper operation and engagement of known vehicle body securing devices to associated vehicle bodies. Thus, with known devices, it may be possible for a vehicle body to enter a protective coating tank without being securely attached to an associated conveyor carrier.

Consequently, it can be understood from the foregoing discussion that it would be desirable to provide a device for securing a vehicle body to a conveyor carrier that overcomes the aforementioned deficiencies. A device of the present invention addresses these problems.

SUMMARY OF THE GENERAL INVENTIVE CONCEPT

A vehicle body clamping device of the present invention includes a clamping linkage secured to a clamping base that is adapted for mounting to a conveyor carrier at a location beneath a vehicle body while said vehicle body is carried on a conveyor carrier. A clamping arm of the clamping linkage extends upward, such that a clamping bar portion thereof protrudes through an aperture in a top face of the clamping base.

One or more actuation assemblies are located below the conveyor carriers and along their path of travel, each of which may include one or a pair of actuator units for operating the clamping linkage. Activation of a first actuator unit causes the clamping linkage to place the clamping bar in an unclamped position, such that a vehicle body can be loaded to or removed from the conveyor carrier. Activation of a second actuator unit cause the clamping linkage to place the clamping bar in a clamped position, such that a vehicle body is securely clamped to the conveyor carrier.

One or more detectors, such as one or more limit switches, are preferably associated with the clamping device. A corresponding detector activator is associated with each actuator unit so that, when the clamping device is operated thereby, a clamped or unclamped position of the clamping linkage may be indicated by the detector(s). A signal may be sent by the detector(s) to an indicator, etc., to facilitate confirmation of the properly clamped or unclamped position of the clamping device.

As described in more detail below, the design of a clamping device of the present invention also minimizes the affect that a buildup of protective coating material may have on proper device operation. Therefore, a vehicle body clamping device of the present invention overcomes the deficiencies of existing vehicle body clamping devices known by the inventor.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
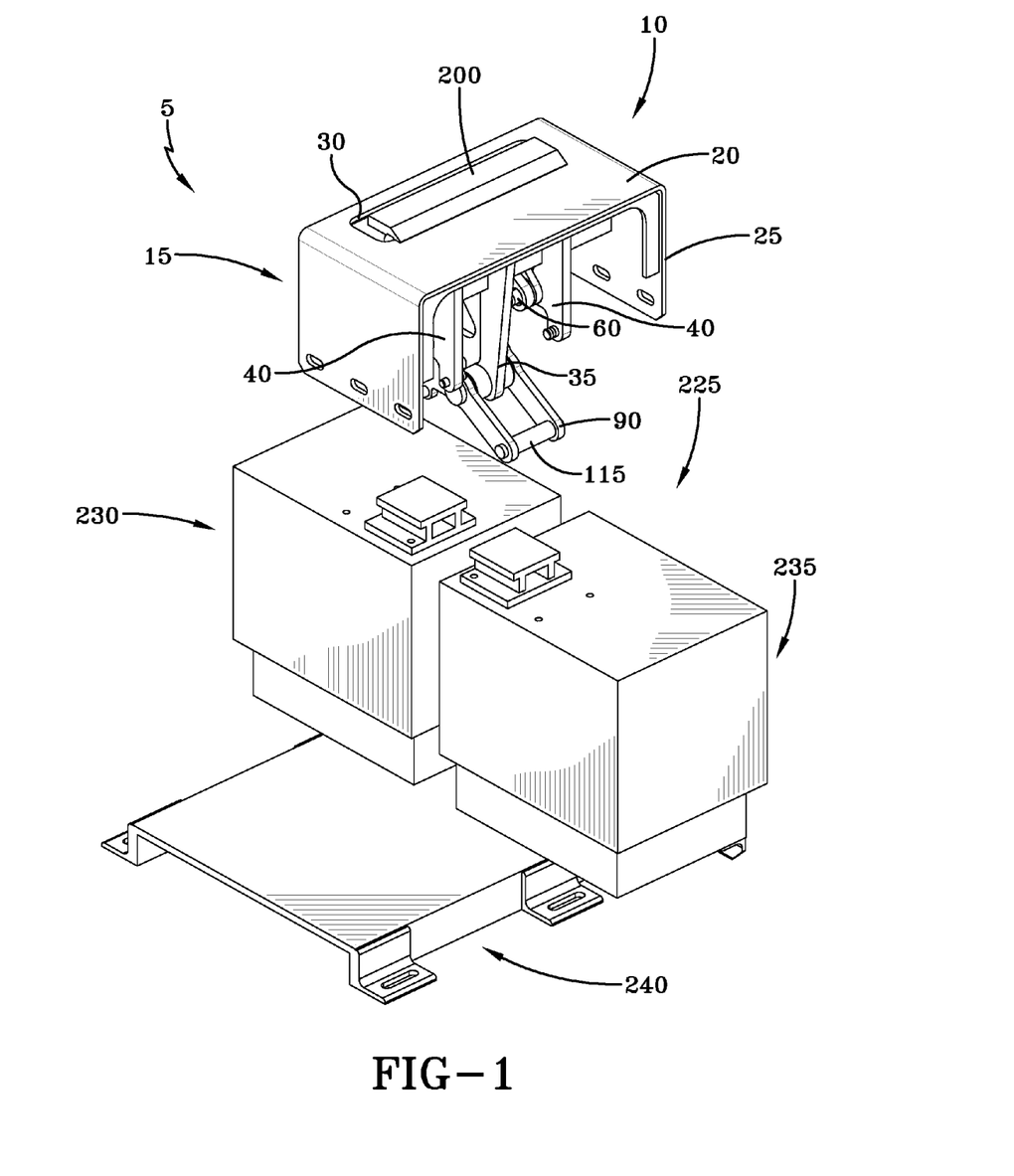
FIG. 1 is a rendered perspective view of one exemplary embodiment of a vehicle body clamping device of the present invention.

One exemplary embodiment of a vehicle body clamping device 5 (clamping device) of the present invention is depicted in FIG. 1. A shown, the clamping device 5 includes clamping linkage unit 10 and an actuation assembly 225.

Figure 2:
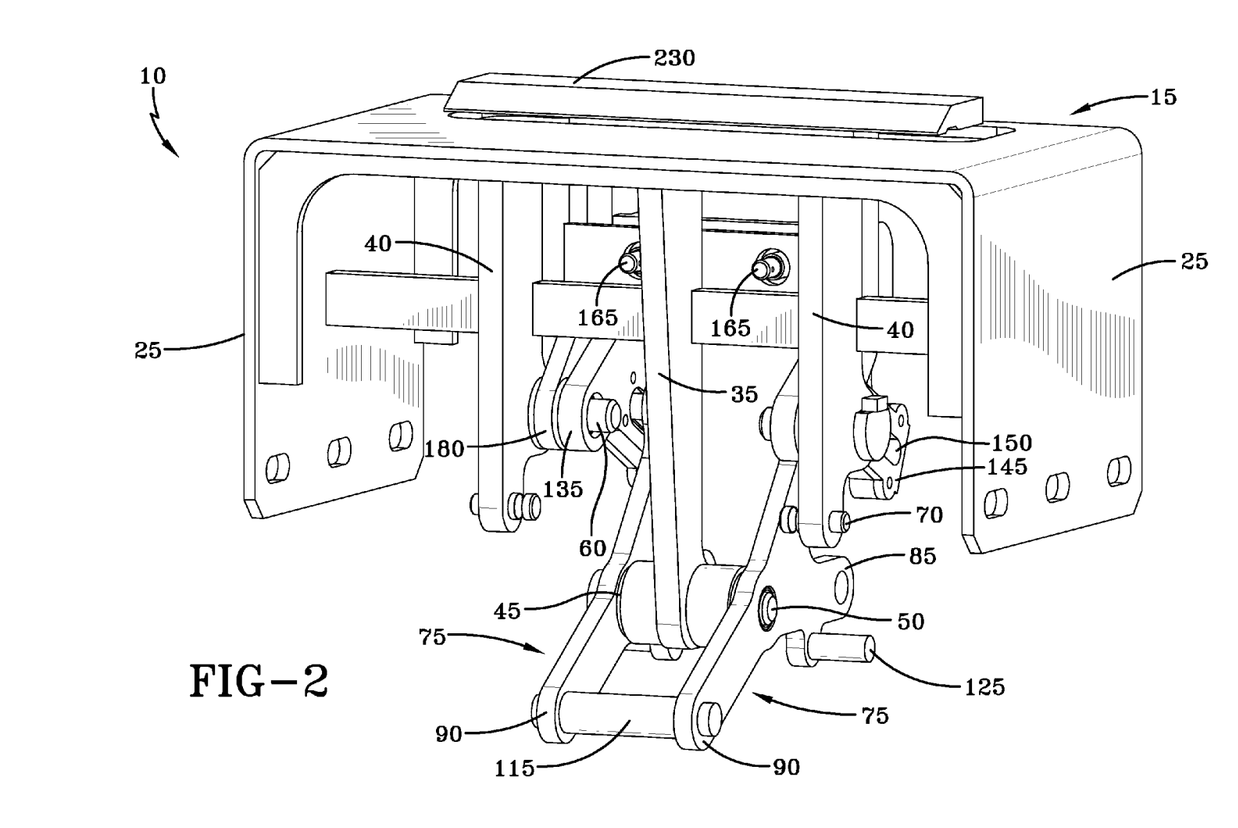
FIG. 2 is a rendered perspective view of a clamping linkage unit of the vehicle body clamping device of FIG. 1.
Figure 3A:
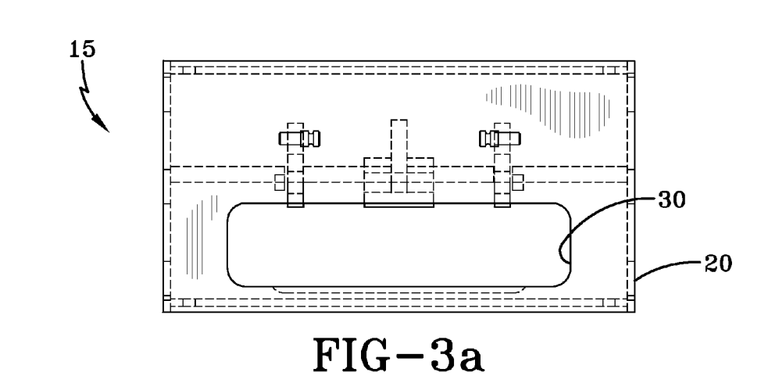
FIGS. 3a-3c are top plan, front elevation, and side elevation views, respectively, of a clamping linkage mounting base of the clamping linkage unit of FIG. 2.
Figure 3B:
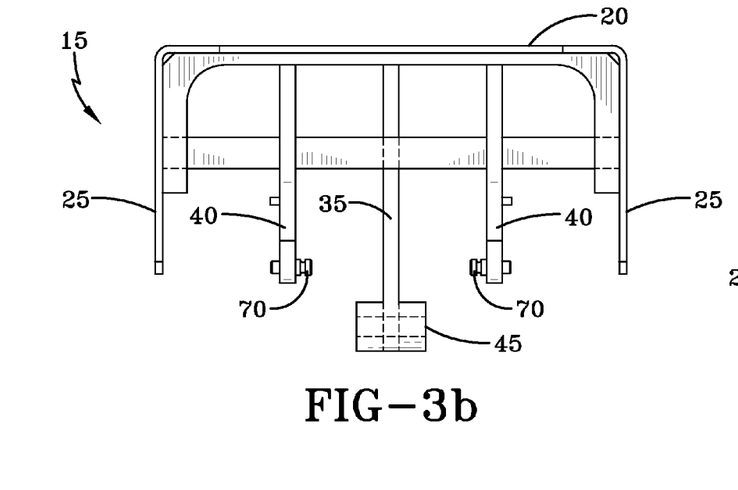
Figure 3C:
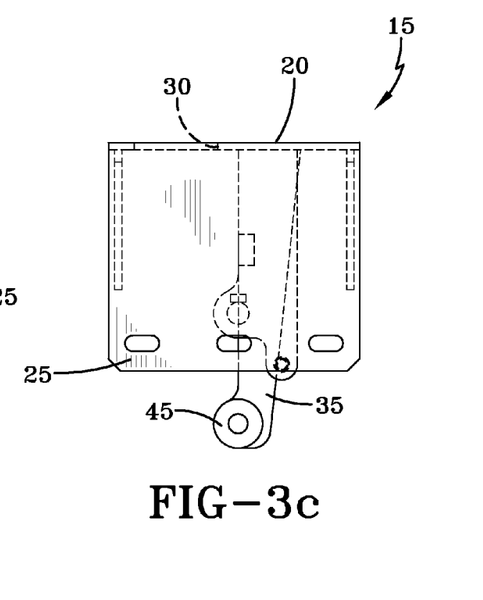

The exemplary clamping linkage unit 10 of FIG. 1 is depicted in more detail in the rendered assembly view of FIG. 2 and in the component drawings of FIGS. 2-6. Operation of the clamping linkage unit 10 can be observed in FIGS. 7a and 8a-8b. As shown, the clamping linkage unit 10 includes a linkage base 15 having a top plate 20 with at least two mounting legs 25 extending downward therefrom. A clamp bar aperture 30 is located in the top plate 20, the purpose of which is described in more detail below.

A number of linkage mounting arms 35, 40 also extend downward from an underside of the top plate 20. A central one 35 of the linkage mounting arms is located at substantially the centerline of the top plate 20 and is shown to extend farther downward than the outward pair of linkage mounting arms 40. The central linkage mounting arm 35 includes a bushing 45 at its distal end for receiving an actuator arm pivot pin 50 (see FIG. 2). The outward pair of linkage mounting arms 40 each include a first bore 55 for receiving a locking arm pivot pin 60 (see FIG. 2) and a second bore 65 for receiving a spring retention pin 70.

Figure 4A:
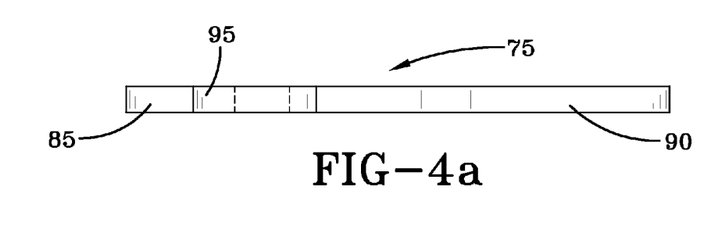
FIGS. 4a-4c are top plan, front elevation, and side elevation views, respectively, of an actuator arm of the clamping linkage unit of FIG. 2.
Figure 4B:
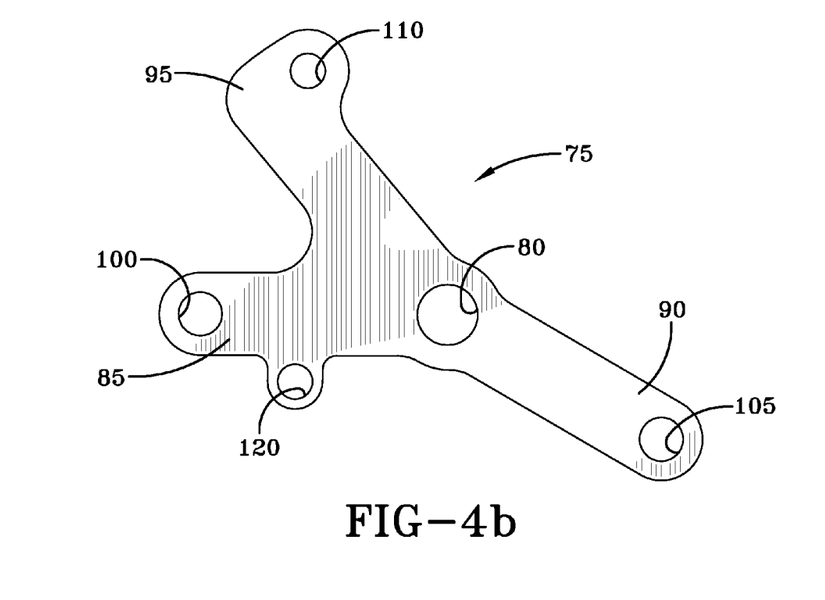
Figure 4C:
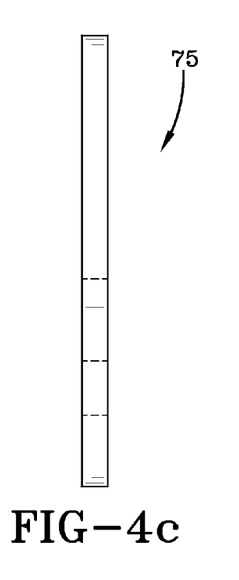

An actuator arm 75 of the exemplary clamping linkage unit 10 is depicted in FIGS. 4a-4c. The actuator arm 75 includes a central pivot aperture 80 through which the actuator arm is connected to the bushing 45 of the central linkage mounting arm 35 by the linkage pivot pin 50. As illustrated most clearly in FIG. 2, the clamping linkage unit 10 employs a pair of actuator arms 75.

This particular embodiment of the actuator arm 75 includes three separate lever members 85, 90, 95 that extend outward at various angles from the area of the central aperture 80. The three lever members 85, 90, 95 of the actuator arm 75 include a clamping contact lever 85, an unclamping contact lever 90, and a connecting lever 95. Each of the clamping and unclamping contact levers 85, 90 include a bore 100, 105, for receiving an actuator arm connector 115 that connects the corresponding unclamping and clamping contact levers of the actuator arm pair. The clamping contact lever 85 also contains a bore 120 for retaining a spring retention pin 125. The connecting lever 95 of the actuator arm 75 includes a bore 110 for connecting the actuator arm to a locking arm 120 of the clamping linkage unit 10.

Figure 5A:
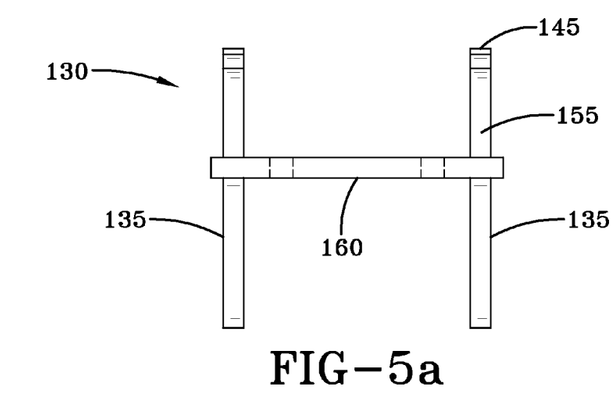
FIGS. 5a-5c are top plan, front elevation, and side elevation views, respectively, of a locking arm of the clamping linkage unit of FIG. 2.
Figure 5B:
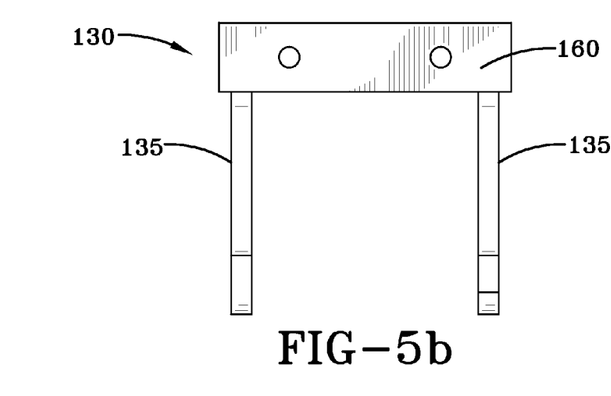
Figure 5C:
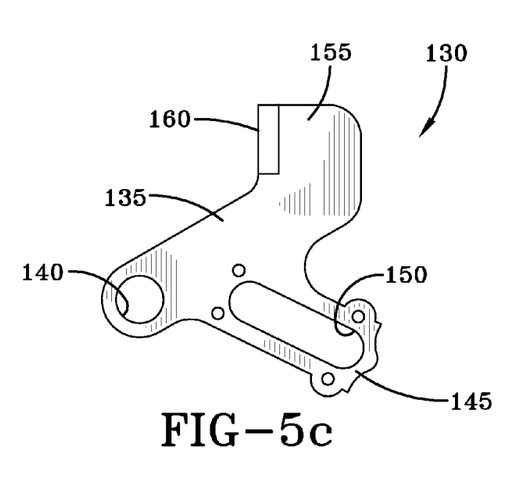

A locking arm 130 of the exemplary clamping linkage unit 10 is depicted in FIGS. 5a-5c. The locking arm 130 is formed by a pair of spaced apart and substantially parallel linkage members 135 that are joined at a distal end thereof by a front engaging plate 160. The linkage members 135 of the locking arm 130 each include a central pivot aperture 140. The locking arm 130 is connected to a respective outward linkage mounting arm 40 of the linkage base 15 by passing a locking arm pivot pin 60 through the central apertures 140 in the linkage members 135 and the bore 55 in the outward linkage mounting arm.

A guide lever segment 145 of each locking arm linkage member 135 extends at a downward angle toward a respective connecting lever member 120 of the actuator arm 75. The guide lever segments 145 each contain an elongated slot 150. The locking arm 130 is connected to a respective actuator arm 75 by a guide pin 152 that passes through the bore 110 in the connecting lever 95 of the actuator arm and rides in the elongated slot 150 of the locking arm guide lever member 145.

Figure 8A:
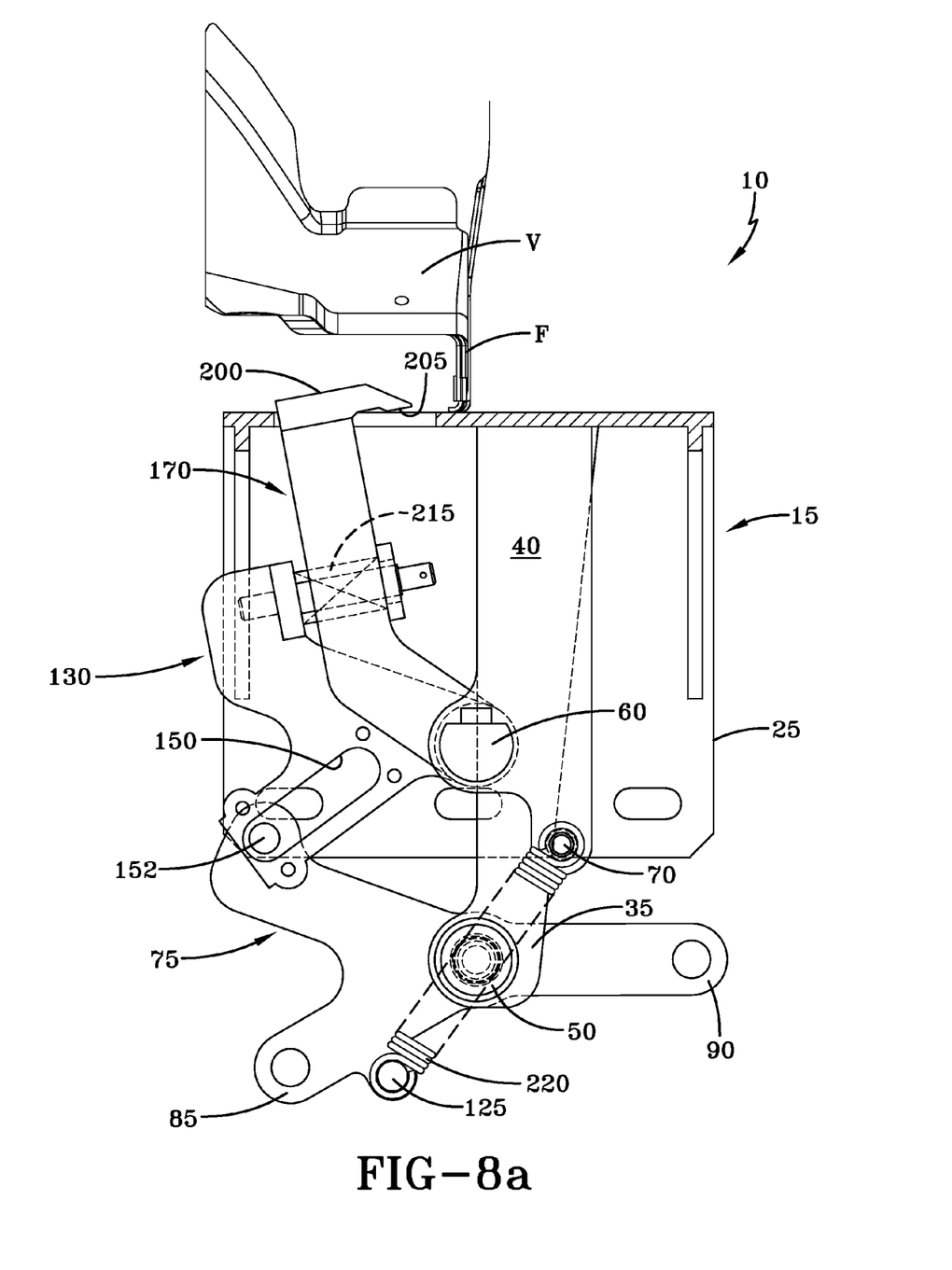
FIG. 8a is a transparent rear view showing the vehicle body clamping device of FIG. 1 placed in an unclamped position.
Figure 8B:
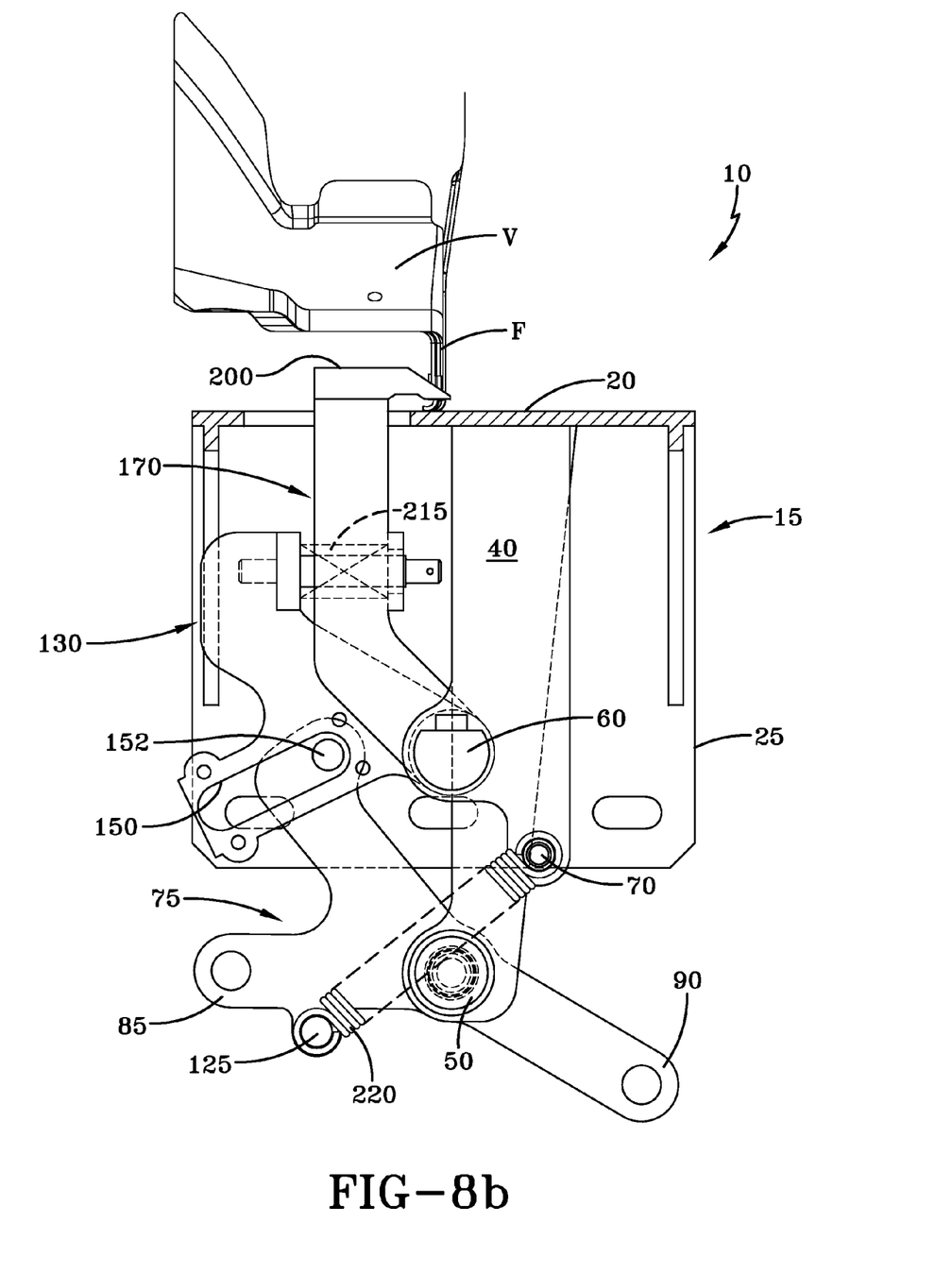
FIG. 8b is a transparent rear view showing the vehicle body clamping device of FIG. 1 placed in a clamped position.

An upwardly extending lever segment 155 located on each linkage member 135 of the locking arm 130 is provided to engage a clamp arm 170, as can be best observed in FIGS. 8a and 8b. Particularly, the front engaging plate 160 of the locking arm 130 is adapted to receive a pair of clamp arm fasteners 165 that extend outward from the engaging plate.

Figure 6A:
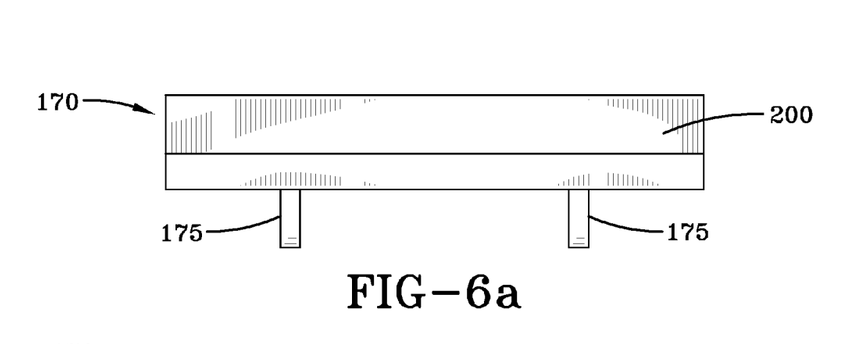
FIGS. 6a-6c are top plan, front elevation, and side elevation views, respectively, of a clamp arm of the clamping linkage unit of FIG. 2.
Figure 6B:
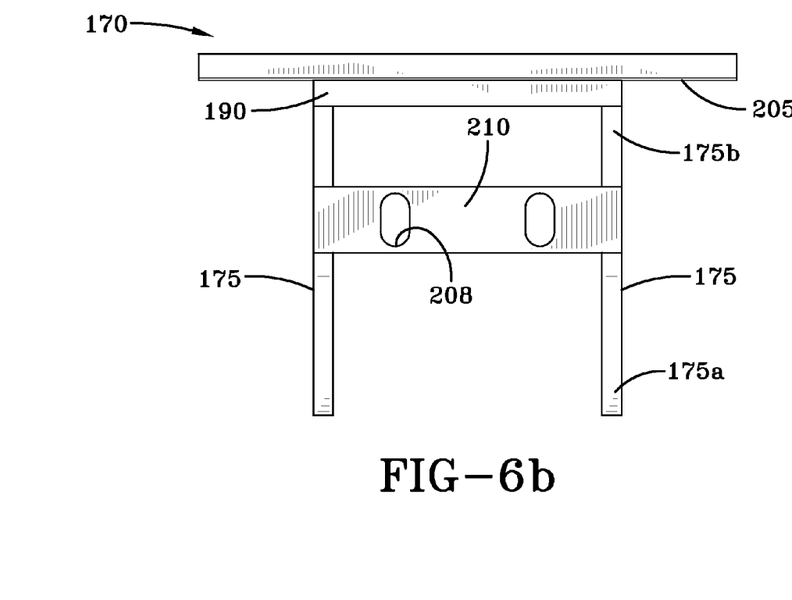
Figure 6C:
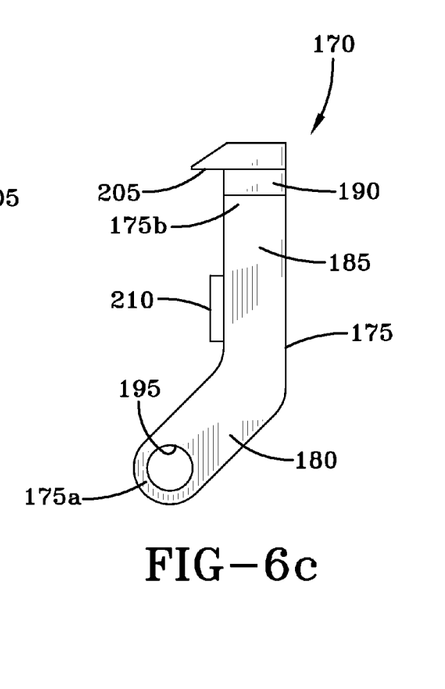

The aforementioned clamp arm 170 of the exemplary clamping linkage unit 10 is depicted in FIGS. 6a-6c. The clamp arm 170 includes a pair of spaced apart and substantially parallel connecting lever members 175 that are joined at a distal end 175b thereof by a top plate 190. Each connecting lever member 175 includes a lower segment 180 and an upper segment 185. The lower segment 180 of each connecting lever member 175 has a connecting aperture 195 near its proximal end 175a, which apertures are operative to couple the clamp arm 170 to the locking arm 130 by receiving therein the locking arm pivot pins 60. Therefore, as can be seen clearly in FIG. 2, the linkage members 135 of the locking arm 130 and the connecting lever members 175 of the clamp arm 170 overlap when the locking arm and clamp arm are assembled to the clamping linkage unit 10.

The lower segments 180 of the clamp arm connecting lever members 175 angle upwardly from the connecting aperture 195 toward the front engaging plate 160 of the locking arm 130. The upper segments 185 of the clamp arm connecting lever members 175 extend substantially vertically from the distal end 175b of the lower segments 180 thereof, so as to pass in front of the front engaging plate 160 of the locking arm 130 (see FIGS. 8a and 8b).

A clamp bar 200 is affixed to an upper face of the top plate 190. As shown, the clamp bar 200 is wider than the top plate 190 such that a clamping lip 205 is formed by the overhanging portion of the clamp bar. The clamping lip 205 of the clamp bar 200 is located to overlie a flange that runs along an underside of a vehicle body of interest. When the clamping device 5 is actuated in a clamping mode, the clamping bar 200 is pulled downward, thereby trapping the flange between the clamping lip 205 and a top surface of the top plate 20 of the linkage base 15.

The locking arm 130 and the clamp arm 170 are connected by passing the fasteners 165 extending from the front engaging plate 160 of the locking arm 130 through corresponding apertures 208 in the mounting plate 210 of the clamp arm. One or more (e.g., a pair, as shown) compression springs 215 preferably reside in the space between the engaging plate 160 of the locking arm 130 and the mounting plate 210 on the clamp arm (see FIGS. 8a-8b). The compression springs 215 urge the clamp arm 170 into a clamped position as the locking arm 130 is rotated upward. The compression springs 215 also allow for flexible positioning of the clamp arm 170 with respect to the locking arm 130 and, thus, flexible positioning of the clamp bar 200 and its clamping lip 205 with respect to a vehicle body flange by which a vehicle will be clamped to a conveyor carrier. Consequently, the clamping linkage 10 may be used to secure different vehicle bodies having flanges of somewhat different position.

Each clamping linkage unit 10 also includes a pair of extension springs 220 that are connected between the spring retention pins 70 extending from the outward linkage mounting arms 40 of the linkage base 15 and the spring retention pins 125 extending from the unclamping contact levers 90 of the actuator arms 75 (see FIGS. 8a and 8b). The spring retention pins 70 are located such that the extension springs 220 simulate an over-center mechanism by supplying tension that encourages the locking arm 130 and clamp arm 170 to remain in its current clamped or unclamped position.

As can be observed in FIGS. 1 and 7a-7c, the clamping device 5 also includes an actuation assembly 225. The particular exemplary embodiment of the actuation assembly 225 shown and described herein includes both a clamping unit 230 and an unclamping unit 235, as shown in FIG. 1. It should be realized, however, that other exemplary actuation assemblies of the present invention may include only an unclamping unit 235. For example, at a conveyor loading point, an actuation assembly having both a clamping unit 230 and an unclamping unit 235 may be provided (whether separately, or as part of a combination assembly). At a conveyor unloading point, an actuation assembly having only an unclamping unit 235 may be all that is required. Other combinations/locations may also be possible. When used together, the clamping and unclamping units 230, 235 may be mounted to a common base 240, as shown.

Figure 7A:
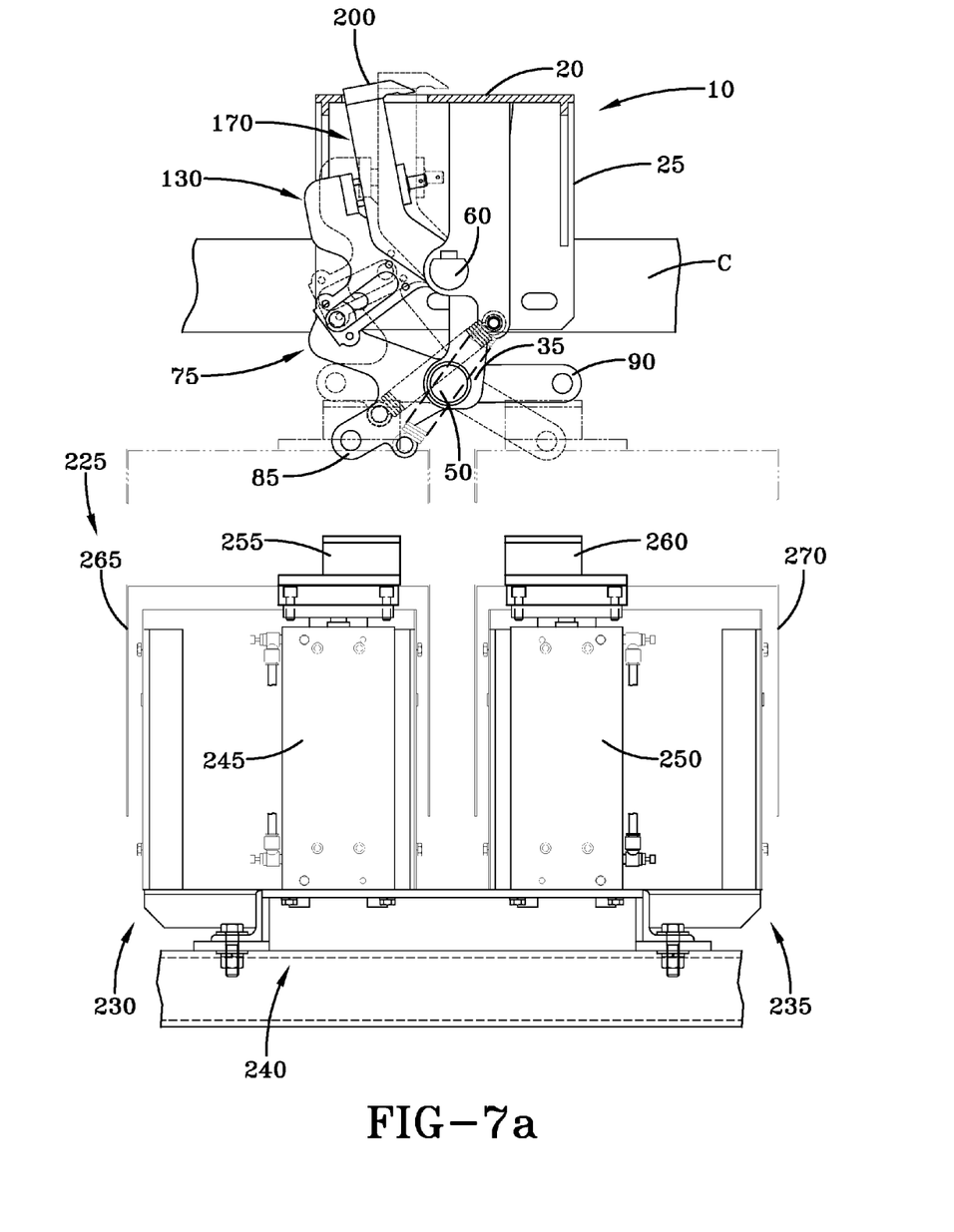
FIGS. 7a-7c are transparent rear elevation, side elevation, and front elevation views, respectively, of an actuation assembly of the vehicle body clamping device of FIG. 1.

Each clamping and unclamping unit 230, 235 includes an actuator 245, 250 that is operative to raise and lower a portion of the respective clamping and unclamping unit (as represented in FIG. 7a). The actuators 245, 250 may include, without limitation, pneumatic cylinders, hydraulic cylinders, motor driven linear actuators, solenoids, etc. As shown, the actuators 245, 250 may be affixed at one end to the base 240.

Each of the clamping and unclamping units 230, 235 also includes a clamping and unclamping linkage contactor 255, 260 that makes contact with a respective one of the clamping contact lever 85 and unclamping contact lever 90 of the actuator arm 75 when the corresponding clamping or unclamping unit is activated. The linkage contactors 255, 260 may contact the actuator arm 75 itself, or the actuator arm connectors 115.

Figure 7B:
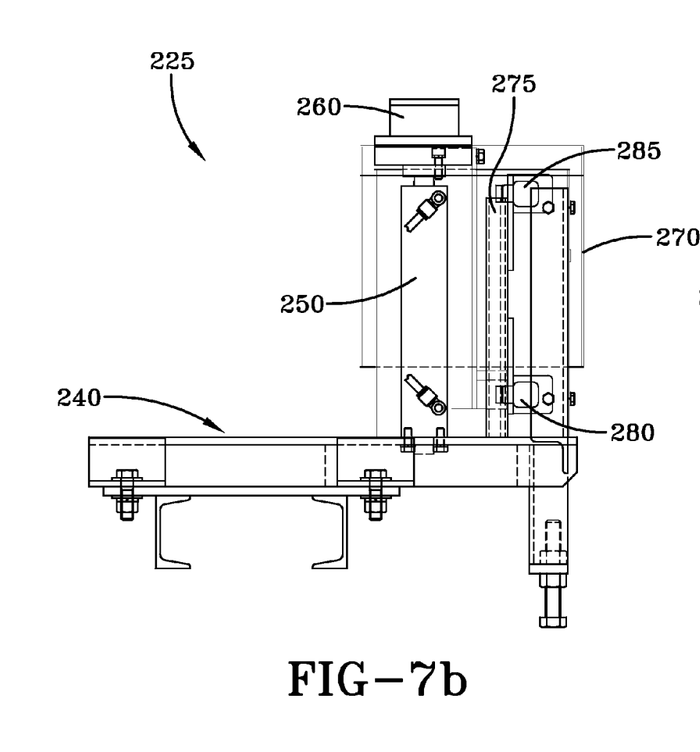
Figure 7C:
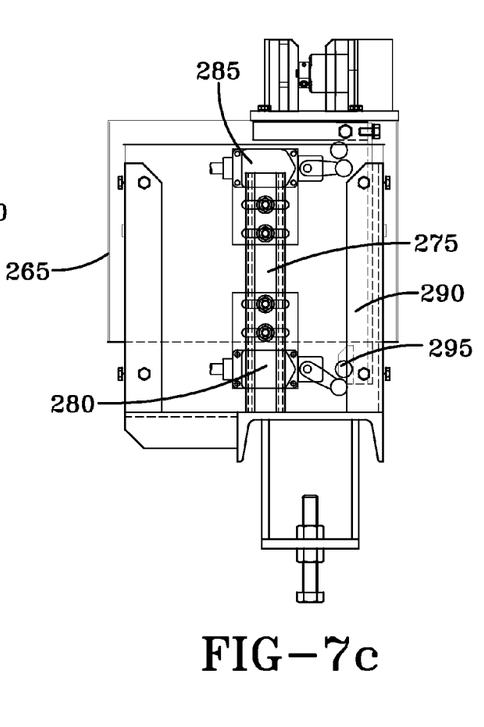

As shown in FIGS. 7a-7c, each of the clamping and unclamping units 230, 235 may include one or more protective covers 265, 270 for protecting the clamping units from dirt and other debris. Also, as most clearly illustrated in FIGS. 7b-7c, a position indicator support member 275 and one or more position indicators 280, 285 may be associated with each of the clamping and unclamping units 230, 235. In this particular embodiment of the clamping and unclamping units 230, 235, two position indicators 280, 285 are fixed to the upright indicator support member 275. The position indicators 280, 285 may include a variety of different devices, which would be familiar to one of skill in the art. Therefore, although the position indicators 280, 285 are shown to be limit switches in this particular exemplary embodiment, it is to be understood that the present invention is not limited to the use of such devices.

As can be best observed in FIG. 7c, the position indicators 280, 285 of each clamping and unclamping unit 230, 235 serve to detect an extended or retracted position of the respective clamping units. More specifically, at least one position indicator trip member 290 is provided, and is adapted to move along with other components of the respective clamping and unclamping units 230, 235 when the clamping and unclamping units are extended or retracted by their respective actuators 245, 250. The position indicator trip member(s) 290 may include a trip dog 295 or similar element for activating a position indicator 280, 285 upon contact therewith or upon placement in proximity thereto. As such, a first position indicator 280 will be activated when a respective clamping or unclamping unit 230, 235 is retracted, and a second position indicator 285 will be activated when a respective clamping or unclamping unit is extended. Each position indicator 280, 285 may transmit a signal when activated, such that the clamped or unclamped position of a clamping linkage 10 may be indicated to an operator (such as by an indicator light, etc.).

As most clearly shown in FIG. 7a, the clamping linkage unit 10 is mounted to a portion of a conveyor carrier C so as to reside beneath a vehicle body V when the vehicle body is carried on the conveyor carrier. While not clearly evident from the drawing figures, at least a pair of clamping linkage units 10 and an associated pair of actuation assemblies 225 are preferably associated with each conveyor carrier C. In this particular embodiment of the present invention, the clamping linkage units 10 are attached to the conveyor carrier C by passing threaded fasteners through associated holes in the mounting legs 25 of the linkage base 15 and into the conveyor structure. As would be obvious to one of skill in the art, a variety of other clamping linkage unit mounting techniques could also be employed.

Referring still to FIG. 7a, it can be observed that the actuation assembly 225 is located below passing conveyor carriers C. More specifically, each actuation assembly 225 is located along the path of conveyor carrier travel, such that the clamping and unclamping units 230, 235 thereof can be actuated to clamp or unclamp a clamping linkage unit 10 as a conveyor carrier C passes overhead. Consequently, the clamping actuation assemblies 225 need not be attached to the conveyor carriers C and, therefore, are not subjected to the buildup of protective coating materials as are the carriers.

The clamping linkage unit 10 is depicted in an unclamped position in FIG. 8a. As can be understood from FIG. 7a, the clamping linkage unit 10 of the clamping device 5 is positioned over an actuation assembly 225 and an unclamping unit 235 thereof is extended by its actuator 250 such that the unclamping linkage contactor 260 thereof contacts the unclamping contact levers 90 (or the actuator arm connector 115) associated with the actuator arms 75, causing an upward movement thereof.

This upward movement of the unclamping contact levers 90 causes the connecting levers 95 of the actuator arms 75 to rotate downward, which produces a like rotation of both the locking arm 130 and the clamp arm 170. This rotation of the clamp arm 170 moves the clamp bar 200 away from a clamping flange F of the carried vehicle body V. Therefore, when the clamp arm 170 of a clamping linkage unit 10 is in an unclamped position, the clamping lip 205 of the clamp bar 200 is clear of the flange F of the carried vehicle body V, and the vehicle body can be loaded to or unloaded from the conveyor carrier C without interference from the clamping device 5.

The clamping linkage unit 10 is depicted in a clamped position in FIG. 8b. As shown in FIG. 7a, the clamping linkage unit 10 of the clamping device 5 is positioned over an actuation assembly 225, and a clamping unit 230 thereof is extended by its actuator 245 such that the clamping linkage contactor 255 thereof contacts the clamping contact levers 85 (or the actuator arm connector 115) associated with the actuator arms 75, causing an upward movement thereof.

This upward movement of the clamping contact levers 85 causes the connecting levers 95 of the actuator arms 75 to rotate upward, which produces a like rotation of both the locking arm 130 and the clamp arm 170. Rotation of the clamp arm 170 moves the clamp bar 200 toward and into pressing contact with the clamping flange F of the carried vehicle body V. Therefore, when the clamp arm 170 of a clamping linkage unit 10 is in a clamped position, the clamping lip 205 of the clamp bar 200 overlies at least a portion of the flange F of the carried vehicle body V. Particularly, the clamping lip 205 of the clamp bar 200 traps the flange F of the carried vehicle body V against the upper surface of the top plate 20 of the linkage base 15. Thus, the vehicle body is secured to the conveyor carrier C in a manner that prevents the floating thereof when the vehicle body is submerged in a protective coating tank.

While certain embodiments of the present invention are described in detail above, the scope of the invention is not to be considered limited by such disclosure, and modifications are possible without departing from the spirit of the invention as evidenced by the following claims:

What is claimed is:

1. A vehicle body to conveyor carrier clamping device, comprising:
 a clamping linkage unit supported by a linkage base and adapted for attachment to a vehicle conveyor carrier, said clamping linkage unit including:
  clamping and unclamping contact levers pivotally coupled to a clamp arm,
  a pair of spaced actuator arms pivotally coupled to either side of a central linkage mounting arm that is suspended below a top plate of said linkage base, said actuator arms each including said clamping and unclamping contact levers and a connecting lever, and
  a locking arm pivotally coupled between a spaced pair of outward linkage mounting arms that are suspended below said top plate of said linkage base, said locking arm including a pair of spaced guide levers with guide slots for receiving a guide pin associated with respective connecting levers of said actuator arms, and a front engaging plate adapted to engage said clamp arm;
 a clamp arm associated with said clamping linkage unit, said clamp arm including a clamp bar adapted and positioned to contact a portion of a vehicle body when said clamping linkage unit is placed in a clamped position; and
 a clamping actuation assembly positioned below and along the path of said conveyor carrier, said clamping actuation assembly including at least a clamping unit and an unclamping unit, each of said clamping unit and unclamping unit having an actuator adapted to move a contactor thereof into displacing contact with a corresponding one of said clamping or unclamping contact levers of said clamping linkage unit as a conveyor carrier passes overhead;
 wherein upward displacement of said clamping contact levers of said clamping linkage by a corresponding clamping actuation assembly clamping unit causes an upward rotation of said actuator arm connecting lever, thereby causing a like rotation of said locking arm and said clamp arm and moving said clamp bar into securing contact with a portion of a vehicle body to be secured to said conveyor carrier; and
 wherein upward displacement of said unclamping contact levers of said clamping linkage by a corresponding clamping actuation assembly unclamping unit causes a downward rotation of said actuator arm connecting lever, thereby causing a like rotation of said locking arm and said clamp arm and moving said clamp bar away from a vehicle body to be secured to said conveyor carrier;
 whereby, said clamping linkage unit is selectively clamped or unclamped to secure said vehicle body to or release said vehicle body from said conveyor carrier.

2. The clamping device of claim 1, further comprising an extension spring extending between a spring retention pin associated with each outward linkage mounting arm and a spring retention pin associated with each actuator arm, said extension pins for biasing said clamping linkage toward an unclamped position.

3. The clamping device of claim 1, further comprising at least one compression spring extending between an engaging plate of said locking arm and a mounting plate of said clamp arm.

4. The clamping device of claim 1, further comprising at least one position indicator associated with each clamping actuation assembly clamping and unclamping unit, said at least one position indicator provided to indicate an extended or retracted position of said clamping and unclamping unit.

5. The clamping device of claim 1, wherein said clamp bar extends through an aperture in a top plate of a clamping linkage unit linkage base.

6. The clamping device of claim 1, wherein said clamp bar includes a clamping lip adapted to engage a flange associated with an underside of a vehicle body of interest.

7. The clamping device of claim 6, wherein said clamp bar traps said flange against a top plate of a linkage base of said clamping linkage unit when said clamping linkage unit is in a clamped position.

* * * * *